(12) United States Patent
Badger et al.

(10) Patent No.: US 6,189,031 B1
(45) Date of Patent: Feb. 13, 2001

(54) METHOD AND SYSTEM FOR EMULATING A SIGNALING POINT FOR TESTING A TELECOMMUNICATIONS NETWORK

(75) Inventors: Brian Badger, Dallas; William Liese, Allen; Craig Newman, Wylie, all of TX (US)

(73) Assignee: MCI Communications Corporation, Washington, DC (US)

( * ) Notice: Under 35 U.S.C. 154(b), the term of this patent shall be extended for 0 days.

(21) Appl. No.: 09/164,728

(22) Filed: Oct. 1, 1998

(51) Int. Cl.[7] .................................................. G06F 15/173
(52) U.S. Cl. ......................... 709/224; 709/225; 709/229; 703/23
(58) Field of Search .................................... 709/224, 225, 709/229, 220, 221; 370/244; 703/23, 24

(56) References Cited

U.S. PATENT DOCUMENTS

| | | | |
|---|---|---|---|
| 5,737,517 | * 4/1998 | Kite et al. ........................ | 714/39 |
| 5,748,617 | * 5/1998 | Autrey et al. ..................... | 370/244 |
| 5,774,695 | * 6/1998 | Autrey et al. ..................... | 703/26 |

* cited by examiner

Primary Examiner—Zarni Maung

(57) ABSTRACT

A system software solution for testing various network elements/entities and processes in a telecommunications network is provided. A network under test contains network entities which save data to a common database that is associated with processing particular test cases. A configurable emulator correlates database data from the network under test and compares the received message with anticipated test case results. A disposition of the test case is determined and a response is made by the emulator. Emulator configuration allows defining a network switching elements predictable behavior, with appropriate response messages thereof, based on received messages. Controlling a network switching elements behavior allows testing the behavior of other related network elements.

25 Claims, 15 Drawing Sheets

TEAMS LOADER
Establishes session with NIC upon startup; can be terminated at any time
Loop until terminated
    Get next entry(s) from NIC FIFO queue; implicit wait
    Decode call record(s) and extract key fields
    Access trunk group filter table
    Discard record(s) if filter table indicates record(s) not of interest
    Insert remaining (if any) call record(s) into SQL DB
    Purge obsolete SQL DB call records
Endloop ARNOLD Loader
Establishes session with ARNOLD upon startup; can be terminated at any time
Loop until terminated
    Get next SS7 message entry(s) from ARNOLD FIFO queue;
implicit wait
    Decode SS7 message and extract key fields
    Process and respond to incoming message
    Insert SS7 message into SQL DB
    Purge obsolete SS7 SQL DB records
Endloop TSERV
Client APIs:
    Retrieve Test Case:
        Particular test application invokes TSERV with test application type and test
case number
        Retrieve from SQL DB the test case by test case number
        Handle any error (e.g. not found)
        Format test script according to test application type
        Return appropriate specific test script from generic test case to calling
application

FIG. 2

Retrieve from SQL DB the test case by test case number

Handle any error...
Loop for all anticipated records
Retrieve next anticipated record from test case anticipated results section
Retieve from SQL DB the matching record according to start time, end time, etc
if (not found) then log error
Else validate record (and timepoint info) and log results
EndLoop
Query SQL DB for records during start time, end time, etc which may be present and should not be
Log any errors thereof
Enter results data and disposition (pass/fail) into CERT table
Return pass/fail status to calling test application
//End of pseudo-code//

FIG. 3

```
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
····▶ MSG=01  OPC=244 001 122  DPC=244 001 101
 IAM    01.00.01.00.00.00.00.00.03.06.0D.03.80.90.A2.07.03.10.07.73.56.01.00.0A.
        07.03.10.12.94.81.52.38.EA.01.00.EB.09.78.10.07.73.56.01.01.04.51.00.
                 ╲─401
        Nature_Of_Connection.....= 00
                .No satellite circuit in the connection
                .No continuity check required
                .No echo control device
        Forward_Call_Indicator...= 00.00
                .Incoming national call (DDD)
                .No end-to-end method available
                .No interworking encountered
                .No end-to-end information available
                .ISDN-UP not used all the way                   ╱402
                .ISDN-UP preferred all the way
                .Non-ISDN originating access
        Calling_Party_Category...= 00
                .Category Unknown -00
        User_Service_Information.= 03.80.90.A2
                .Information Transfer: Speech
                .Coding Standard: CCITT Standard
                .Transfer Rate: 64 Kbits/s
                .Transfer Mode: Circuit Mode
                .Layer ID: User Information layer 1
                .Bearer Capability: CCITT Rec G.711 U-Law
        Called_Party_Number......= 07.03.10.07.73.56.01.00
                .NOA:03h= Domestic/Intl in WZ1 (10D)
                .Numbering Plan: ISDN (Telephony)
                .Number: "703-765-1000"
     1. Calling_Party_Number..= 0A.07.03.10.12.94.81.52.38
                .NOA:03h= 10D ANI Unique National Num
                .SCRN: User provided, Not Screened
                .PRES: Address Presentation Allowed
                .Numbering Plan: ISDN Telephony
                .Number: "214-918-2583"                         ╱404
     2. OLI..................= EA.01.00
                .OLI=00, Plain Old Telephone Service (POTS)
     3. Charge_Number.........= EB.09.78.10.07.73.56.01.01.04.51
                .NOA:78h - Transfer Sequence Number
                .Numbering Plan: ISDN Numbering Plan
                .Charge Number: 70376510104015
     4. End_Of_Optionals......= 00
```

FIG. 6

| Cause Value | Response |
|---|---|
| 000 to 127 | Send a Release message with the appropriately mapped cause value. |
| 128 | Send ACM with BCSI=00 00 indicating DEFAULT. Then send ANM. |
| 129 | Send ACM with BCSI=40 00 indicating DNIS. Then send ANM. |
| 130 | Send ACM with BCSI=04 00 indicating CSI. Then send ANM. |
| 131 | Send ACM with BCSI=44 00 indicating DNIS+CSI. Then send ANM. |
| 132 | Send ACM with BCSI=80 00 indicating DT. Then send ANM. |
| 133 | Send ACM with BCSI=84 00 indicating DT+CSI. Then send ANM. |
| 134 | Send ACM with BCSI=C0 00 indicating DT+DNIS. Then send ANM. |
| 135 | Send ACM with BCSI=C4 00 indicating DT+DNIS+CSI. Then send ANM. |
| 136 to 999 | Send Default Release With Cause. (Unused and reserved for future growth) |

FIG. 7

MGTSCOM=3,9600,N,8,1,IRQ5

LOGFILE=H:\ARNOLD.LOG RESPONSE=C:\BP\ARNOLD\RESPONSE.CFG

BILLNUMS=c:\BP\ARNOLD\BILL.CFG

CARDNUMS=c:\BP\ARNOLD\CARD.CFG

RWCNXX=299,928

TPDNXX=374

RNANXX=388

ATBNXX=381

RWCNOA1=918,928

NOA1RWCTABLE=9:19,90:1,91:2,92:17,93:18,94:19,95:20,96:28,97:34,

98:42,990:1,991:17,992:18,993:19,994:2,995:20,996:28,997:34,998:42,

9801:1,9817:17,9818:18,9819:19,9802:2,9820:20,9828:28,9834:34,

9842:42,98001:1,98017:17,98018:18,98019:19,98002:2

NOA1RWCTAB2=98020:20,98028:28,98034:34,98042:42

RWCNOA4=967,196

RWCLOC = 345

FIG. 8

RESPONSE #1 (Default response 100 for BOC card validation)

3C E4 3A C7 04     ES 32 EA 30 CF 01 **

F2 2B DF 53 02 10 20 DF 67 01 01 DF 4D 01 01 DF 61 01 01 DF 49 06 16 00 01 03 22 22 DF 57 02 09

01 DF 49 09 0A 00 11 0A 07 73 22 10 00

RESPONSE #2 (Default response 100 for collect or third party)

48 E4 46 C7 04     E8 3E EA 3C CF 01 **

F2 37 DF 53 02 01 02 DF 67 01 01 DF 52 01 01 DF 6A 01 01 DF 6C 01 01 DF 68 01 01 DF 5A 01 01 DF 49 06 16 00 01 03 22 02 DF 57 02 09 01 DF 49 09

09 00 11 0A 07 73 22 10 11

RESPONSE #3 (Response 111 for collect L12B111R.SCC)

48 E4 46 C7 04     ES 3E EA 3C CF 01 **

F2 37 DF 53 02 01 02 DF 67 01 01 DF 52 01 07 DF 6A 01 07 DF 6C 01 01 DF 68 01 01 DF 5A 01 01 DF 49 06 16 00 01 03 22 02 DF 57 02 09 01 DF 49 09

09 00 11 0A 12 94 81 22 66

RESPONSE #4 (Response 414 for collect L12B414R.SCC)

RESPONSE #5 (Response 100 for collect w/ options L12B100R.SCC)

63 E4 61 C7 04     E8 59 EA 57 CF 01 **

F2 52 DF 53 02 01 02 DF 67 01 01 DF 52 01 01 DF 6A 01 01 DF 6C 01 01 DF 68 01 01 DF 5A 01 01 DF 49 06 16 00 01 03 22 02 DF 57 02 12 02 DF 49 06

0D 00 01 03 33 03 DF 49 06 0B 00 01 03 44 04 DF 49 06 0C 00 01 03 55 05 DF 49 09 09 00 11 0A 12

94 81 22 66

RESPONSE #6 (Response 413 for collect L12B413R.SCC)

RESPONSE #7 (Response 100 for BOC card w/options L12C100R.SCC)

57 E4 55 C7 04     E8 4D EA 4B CF 01 **

F2 46 DF 53 02 01 02 DF 67 01 01 DF 4D 01 01 DF 61 01 01 DF 49 06 16 00 01 03 22 22 DF 57 02 12

02 DF 49 06 0D 00 01 03 22 02 DF 49 06 0B 00 01

04 33 33 DF 49 06 0C 00 01 03 44 04 DF 49 09 0A 00 11 0A 13 39 66 66 66

RESPONSE #8 (Response 413 for BOC card L12C413R.SCC)

15 E4 13 C7 04     E8 0B EA 09 CF 01**

D5 02 01 01 F2 00

RESPONSE #9 (Response 414 For BOC card L12C414R.SCC)

15 E4 13 C7 04     E8 0B EA 09 CF 01

F2 04 DF 4C 01 01

RESPONSE #10 (Response 110 for BOC card L12C110R.SCC)

METHOD AND SYSTEM FOR EMULATING A SIGNALING POINT FOR TESTING A TELECOMMUNICATIONS NETWORK

BACKGROUND OF THE INVENTION

1. Field of the Invention

The present invention relates generally to communication systems and in particular to a communications test system. Still more particularly, the present invention relates to a method and system for emulating a signaling point for testing a telecommunications network.

2. Description of the Related Art

Testing telecommunication services can be a laborious and time consuming task. This is especially true in today's environment where a wide variety of new telecommunication services are being rapidly deployed. In addition, the increased use of intelligent network elements including automation devices such as audio response units (ARUs), and intelligent switches, such as automatic call distributors, complicate the task of testing new telecommunication services. Telecommunication services are typically tested and re-tested at various stages throughout the development process.

For example, as new services are being developed they are typically modified and refined. The modifications are generally based on several factors including marketing studies, customer feedback, hardware and software design changes, and network element changes. To implement such modifications during the development cycle, product development organizations modify the software that drives the various network elements used to support the new service. The modified software versions are then released to testing organizations that are responsible for verifying the functionality and performance of the new service. Accordingly, during a typical product development cycle, many different software versions may be released to the testing organizations as the features and functions of the new service evolve.

Thus, testing organizations typically perform many iterations of various test activities to verify that new services operate as designed and do not adversely affect existing telecommunication services. The dynamic nature of the development of new services, and the time-to-market pressures imposed upon the telecommunications industry, drive the need for timely and efficient test procedures.

Often these requirements are met by automating test procedures. Once test cases are automated they can be repeated with minimal effort. This automation facilitates regression testing, which verifies common features among different software versions. In addition, automated test cases are generally more reliable than manual test cases due to the reduction of human factor errors. Further, automated test systems are more efficient and reliable because they execute test cases repeatedly in exactly the same manner.

However, in order to gain the maximum benefit from automation, test cases must be designed for execution without human interaction. This not only reduces test staff requirements, but also enables one to run test cases continuously during the day or night. In order for test cases to run unattended, they must be able to verify the correct operation of telecommunication services and they must be able to detect errors when they occur. Typically, test cases are designed to accomplish this by dynamically comparing the test case results against predefined expected results. Alternatively, test cases can be programmed to generate test result logs or the like, which can be analyzed at a later time.

In addition, in order for test cases to run unattended, the telecommunication service under test must not require human interaction. For example, telecommunication services such as voice mail systems, automated collect call services and the like, generally require human interaction. Human interaction can be in the form of speech and/or telephone keypad input. As such, testing these types of telecommunication services are conventionally performed manually.

Another difficulty arises when testing telecommunication services that include the use of manual operators. Typically such services involve human operators interacting with customers from manual operator consoles. The very nature of such human interaction makes the testing of such service inherently difficult to automate. Thus, these types of services are also conventionally tested manually. Moreover, today's hardware is increasingly dependent upon and tightly coupled with software that enables many of the features that consumer's demand. As the software and hardware are joined, the complexity of the software components and the difficulty of testing the union of the software and the hardware have increased in complexity.

Former software and hardware development tools included editors, debuggers and a lot of programmer sweat time. With the complexity of modem software and hardware, and the many possible scenarios that must be tested to assure proper system function, it is necessary to replace older, primitive tools with a testing system that is flexible and capable of testing many, diverse permutations of software enabled hardware features.

SUMMARY OF THE INVENTION

The foregoing problems are overcome in an illustrative embodiment of the invention in which a system for testing various network elements/entities and processes in a telecommunications network is provided. A network under test contains network entities which save data to a common database that is associated with processing particular test cases. A server correlates database data from the network under test and compares it to anticipated test case results. A disposition of the test cases is determined. Various elements of the invention interface appropriately, and process accordingly, to accomplish the testing and test result(s) disposition that include intelligent network elements such as automated response units, and manual network elements such as manual operator consoles. The test system can be used to test services in an automated fashion that have traditionally been very difficult or impossible to automate due to the requirement of human interaction.

The system of the preferred embodiment comprises a means for communication between a test call controller and one or more Intelligent Service Platforms within an Intelligent Services Network (ISN), such as Operator Network Centers (ONCs), and the like. ONCs are used to provide human and automated operator services to customers through the use of manual operator consoles, and Audio Response Units (ARU)s. The test system of the preferred embodiment provides two way communications between the network elements within ONCs and the test call controller. The communication means is used to facilitate automation of test calls for products that use such operator services.

For example, the communication means of the preferred embodiment can be used to send keystrokes to a manual operator console. The keystrokes sent during a test call are received by the manual operator console and used as input to the console. In this manner, the controller emulates a live operator typing on an operator console.

Similarly, the communication means of the preferred embodiment can be used to send status information from the manual operator console to the controller. In this manner, the controller receives the same information as a live operator would receive from the console's display screen. This includes caller information, such as a caller's name or the called number, as well as signaling information such as call ringing, call answering, etc.

In a similar fashion, the controller of the preferred embodiment receives status information from ARUs. Such information includes for example the identification of a particular vocal script that is being played to a caller, or status information such as call received and call ringing messages. In a preferred embodiment, the communication means comprises a message protocol such as the User Datagram Protocol/Internet Protocol (UDP/IP). Both the controller of the preferred embodiment and each element within the ONC contain UDP/IP communication components.

A preferred embodiment also comprises a test call generator used to generate test calls in the communication network. The controllers operate in accordance with instructions in a test call script that controls the test call generator. The test call script also provides the commands pertaining to the previously mentioned two-way communication means between the controller and the various elements within the ONC.

In addition, the system of the preferred embodiment comprises a means for verifying billing records within the telecommunications network. The controller of the preferred embodiment creates a billing template that comprises expected billing information for each test call. The billing template is then compared against data from a billing verification system that reflects actual billing results from the communications network.

The controller of the preferred embodiment also comprises an audio generation and capturing device. This device is used to generate speech output and/or capture speech input. The speech capabilities of the preferred embodiment are used to interact with telecommunication services under test in an automated fashion. Thus, for example, the controller may cause the audio generator to generate a particular speech signal in response to a particular script from an ARU. Integrated into the system is a configurable emulator that directly correlates database data from the network under test and compares the received test message with anticipated test case results. A disposition of the test case is determined and a response is made by the emulator. Emulator configuration allows defining a network switching elements predictable behavior, with appropriate response messages thereof, based on received messages.

BRIEF DESCRIPTION OF THE DRAWINGS

The above and further advantages of the invention may be better understood by referring to the following description in conjunction with the accompanying drawings, in which:

FIG. 2 is an illustration of pseudo code used in testing a communications system is illustrated in accordance with a preferred embodiment of the present invention;

FIG. 3 illustrates pseudo code for retrieving data from a SQL database;

FIG. 6 is a text file containing information from an IAM test message in accordance with a preferred embodiment of the present invention;

FIG. 7 is a diagram of cause values and associated responses in accordance with a preferred embodiment of the present invention;

FIG. 8 is an illustration of commands that may be included in a configuration file in accordance with a preferred embodiment of the present invention;

FIGS. 9A–9C are examples of formats for a configuration file in accordance with a preferred embodiment of the present invention;

FIG. 10 is a configuration file formatted in accordance with a preferred embodiment of the present invention;

FIG. 11 is an illustration of a billing configuration file formatted in accordance with a preferred embodiment of the present invention;

DETAILED DESCRIPTION

The present invention covers ARNOLD, a Signaling Point ("SP") emulation for SS7 networks. SS7 messages are exchanged between network elements over 56 or 64 kilobit per second (kbps) bidirectional channels called signaling links. An A (access) link connects a signaling end point to an STP. Only messages originating from or destined to the signaling end point are transmitted on an A link. Network traffic between signaling points (SPs) may be routed via a packet switch called an STP. An STP routes each incoming message to an outgoing signaling link based on routing information contained in the SS7 message. Because it acts as a network hub, an STP provides improved utilization of the SS7 network by eliminating the need for direct links between SPs.

Each SP in the SS7 network is uniquely identified by a numeric point code. Point codes are carried in signaling messages exchanged between SPs to identify the source and destination of each message. Each signaling point uses a routing table to select the appropriate signaling path for each message.

Signaling occurs out-of-band on dedicated channels rather than in-band on voice channels. Compared to in-band signaling, out-of-band signaling provides faster call setup times (compared to in-band signaling using multifrequency (MF) signaling tones), more efficient use of voice circuits, support for Intelligent Network (IN) services which require signaling to network elements without voice trunks (e.g., database systems) and improved control over fraudulent network usage.

ARNOLD is configured at startup, or real-time. ARNOLD's flexible configuration parameters allows defining (predictable) particular SP behavior, with appropriate response messages thereof, according to received SS7 messages, for example, based on fields of the initial Address Message (IAM) received on an SS7 Access link (A link). Controlling SP behavior allows testing behavior of other related network elements. Additional configurable/ predictable behavior includes responding to Transaction Capabilities Application Part ("TCAP") messages. The reference to processing messages over SS7 networks does not however limit the scope of the invention, and the current invention may be employed in the testing of other network environments.

Figure 1:
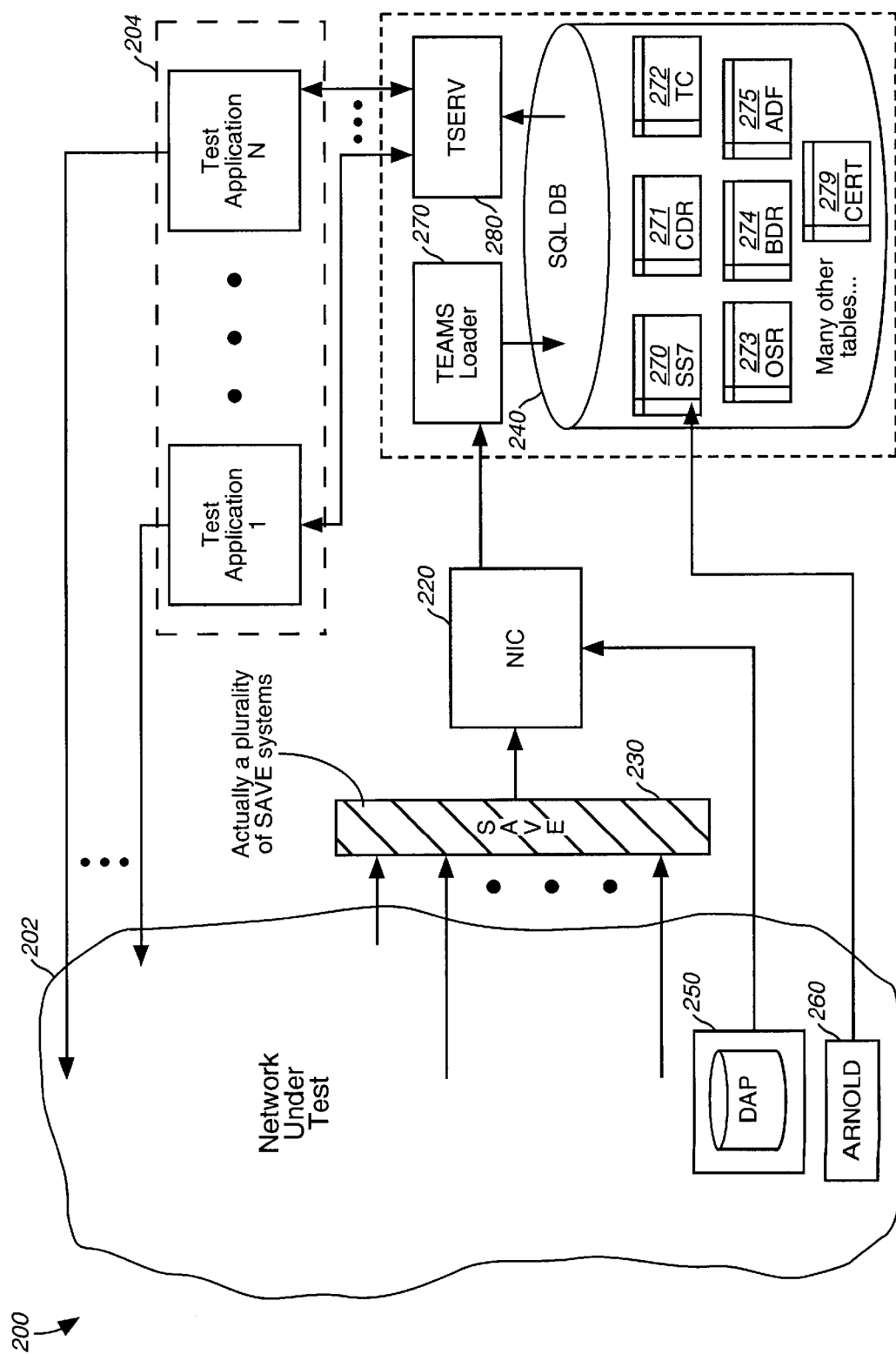
FIG. 1 is a diagram of a telecommunications system test platform in accordance with a preferred embodiment of the present invention.

FIG. 1 depicts a preferred embodiment of a telecommunications system test platform and is denoted generally as 200. The entity to test is Network Under Test 202 (e.g. an ISN), for example an integrated Services Digital Network (ISDN), Common Channel Signaling 7 (CCS7, SS7 for short), or any other type of ISN. Software and hardware entities in the network must be verified for proper operation. Various Test Applications 204 have been developed to perform testing.

These applications typically have a specialization in the hardware and/or software of a network that is to be tested. Conventional test applications have typically evolved different methodologies and test processes to achieve objectives.

The preferred embodiment provides a single system test platform by which any number and type of test applications can perform testing.

Entities in the network under test communicate critical event data to a Network Information Concentrator (NIC) 220—a server. A specialized hardware interface between network entities, referred to as Save 230, allows communicating the critical event data (e.g. billing information) to the NIC 220, which in turn facilitates entry of the event data into a centralized database 240. Save 230 is typically a series of fault redundant (i.e. two processors) computers (e.g. Stratus Polo) which provide translation between a network element and the NIC 220.

Save 230 box in FIG. 1 can be a plurality of SAVE systems for the network. While there is typically a single SAVE system per network element, there can be multiple network elements connected to a single SAVE system provided the elements are located together. A network element is connected to a Save system through an FTAM or X.25 protocol. A particular Save system uses TCP/IP to communicate with NIC 220.

The centralized database is preferably an SQL database, and is referred to as a Structured Query Language DataBase (SQL DB) 240. In a SS7 embodiment, entities such as a DAP server 250, and ARNOLD 260(a SP emulation developed facilitating test of signaling aspects), may communicate critical test data directly to the SQL DB 240.

The NIC 220 synthesizes event data into a suitable form and enters transactions into a FIFO queue. A Test Execution and Automation Management System (TEAMS) Loader process 270 developed to manage the SQL DB 240, feeds from the NIC 220 queue with appropriate communications (e.g. TCP/IP) and enters the events into tables (270–279) of the SQL DB 240. All appropriate events in the network under test are logged into the SQL DB 240 either directly, or through the NIC 220, for all test cases that are performed.

TEAMS Loader 270 filters out all records from the NIC 220 which are not of interest. In one embodiment, the originating trunk group of a test case is utilized to determine which records are of interest. A table of trunk groups that are not related to current test cases can also be maintained in the SQL DB 240 to indicate which records to discard. Typically products developed in-house insert events directly into the SQL DB 240 and products developed by vendors interface through NIC 220 process, and TEAMS loader 270 was specifically developed to efficiently interface NIC 220 to the SQL DB 240.

The SQL DB 240 contains many tables of many types of records. FIG. 1 depicts a few examples, perhaps the most recognizable by those skilled in the related arts which are discussed below.

SS7 (270): SS7 signaling events from signaling entities in the network under test and logs them.

CDR (271): Call Detail Records, for example of the billing event variety, communicated by switches through the NIC.

TC (272): Test Cases that are used by various Test Applications. The Test Generation System (TGS) is utilized to build generic test cases, each of which can be used by any of the test applications. Each test case (TC) contains: (1) a reference number (i.e. test case number); (2) a human readable section of the test case for tester utilizing many types of test applications; (3) the generic test script for performing test cases with porting means to various test applications; and (4) an anticipated test results section.

The anticipated result section contains a representation of all anticipated records from the network under test (e.g. SS7, CDRs, OSRs, etc.). The representations are models (i.e. wildcarded) for matching actual records from the network. Specific fields of the record which are only dependent on the particular element which reported the record are not necessarily specified with anticipated results. The fields that show that a test case passed or failed are explicitly defined in anticipated results for matching. There is additional data maintained in the SQL DB for accomplishing test case versioning, such as the following:

OSR (273): Operator Service Records, communicated by OS entities, or ACDs (automatic call distributors), in the network through the NIC;

BDR (274): Billing Detail Records, communicated by an ARU, VRU, MTOC, or ATOC in the network through the NIC;

ADF (275): Abstract Data Format records communicated from translation entities which access a DAP in the network, for example to determine routing of an 800 number; and CERT (279): Certification data is maintained for all executed test cases to assure acceptance of test case results by qualified owners/representatives of entities in the network under test.

With reference back to FIG. 1, TEAMS Server (TSERV) 280 process provides a client interface (client API, e.g. with TCP-IP) to all test applications (202–208). Test applications access their view (i.e. generic TC definition is customized for request by particular test application type) of a test case through TSERV 280 when ready to perform a test case. Upon completion of a test case, or a batch of test cases, the particular test application 208 couples to TSERV 280 to obtain test case results. A test application is typically executed on a personal computer coupled to an originating switch through a circuit, or trunk (e.g. by means of a test unit like SAGE, AMERITEC, DIALOGIC, etc). Calls are typically automatically initiated (i.e. numbers are dialed automatically). The dialed digits and network configuration uniquely defines the particular test that is appropriate to perform, and the type of test case as detailed below.

Anticipated test case results (i.e. anticipated events logged by applicable entities in the network under test) are stored as part of a test case. When invoked by a test application (through a client API) for test case results, TSERV 280 compares all events logged in the SQL DB 240 for a particular test case with anticipated test case results, and renders a disposition. The test application 209 is returned to with a disposition describing whether the test case produced the anticipated results, or what portions of the test case were in conflict. TSERV 280 manages an archive of test case results in the CERT table. A certification application interfaces to the CERT data appropriately. A preferred embodiment assumes the system contains: a primitive CERT table containing a pass/fail status and information for identifying failures along with the test case reference number, and that users can browse the CERT table with a basic database query tool.

TSERV 280 utilizes time information to correlate associated records. A preferred embodiment utilizes time-point validation and time synchronization of systems, and logs events to a SQL DB 240. Time synchronization and consistency for processing, and tracked events are provided in a preferred embodiment of the invention.

Preferably, the TEAMS loader 270 and TSERV 280 processes are executing on the same system which contains the SQL DB 240 that enables database transactions to be performed locally in a data processing system 272, such as, for example a DEC Alpha computer system.

The system also provides validation and synchronization of all network entities that must cooperate for comprehensive testing which is referred to as time point validation. A preferred embodiment is directed to an integrated system for capturing timepoints associated with critical events in a phone call from a test application perspective (particularly the events important to correct billing) and comparing those timepoints with actual results from the tested network. Timepoints refer to time information for key milestones in the progress of call processing. Time information of applicable network elements is first assured to be synchronized, or appropriately translated for consistency. The test records associated with the test case (e.g. call), are used to produce an accurate test case result.

Timepoints are data/time stamps of key milestones in the progress of call processing. Timepoint testing of billing records is essential to assure that customers are being billed accurately. In the past, timepoint testing has been performed manually, and client test applications have not been integrated for automated timepoint validation. Automation of timepoint testing to validate billing records is needed to shorten test time and improve results.

Test elements developed for in-house applications are interconnected by means of a Local Area Network (LAN) and are time synchronized using a time protocol (e.g. Network Time Protocol Standard) to assure consistency. The time (e.g. Mar. 27, 1997, 10:03AM) on one system is always the same time on all other systems managed with the time protocol and connected via the LAN. Test elements, for example telephony elements in the network under test, consists of many types of equipment, many different vendors for that equipment, different geographical locations, and other variables. The varieties produce different times on particular systems. Time information may be in different time zones, different formats, different units, etc. It is important to be able to correlate data in the SQL DB together with common data/time reference.

To assist one of ordinary skill in the programming art to implement a preferred embodiment of the present invention without undue experimentation, pseudo-code is shown in FIG. 2, which describes the detailed logic in accordance with aspects of the invention.

Test Case Result

A particular test application invokes TSERV for test case result (assume 1 TC for pseudo-code simplicity) with test case number, start time, and timepoint information as parameters. FIG. 3 illustrates pseudo code for retrieving data from a SQL database.

Figure 4:
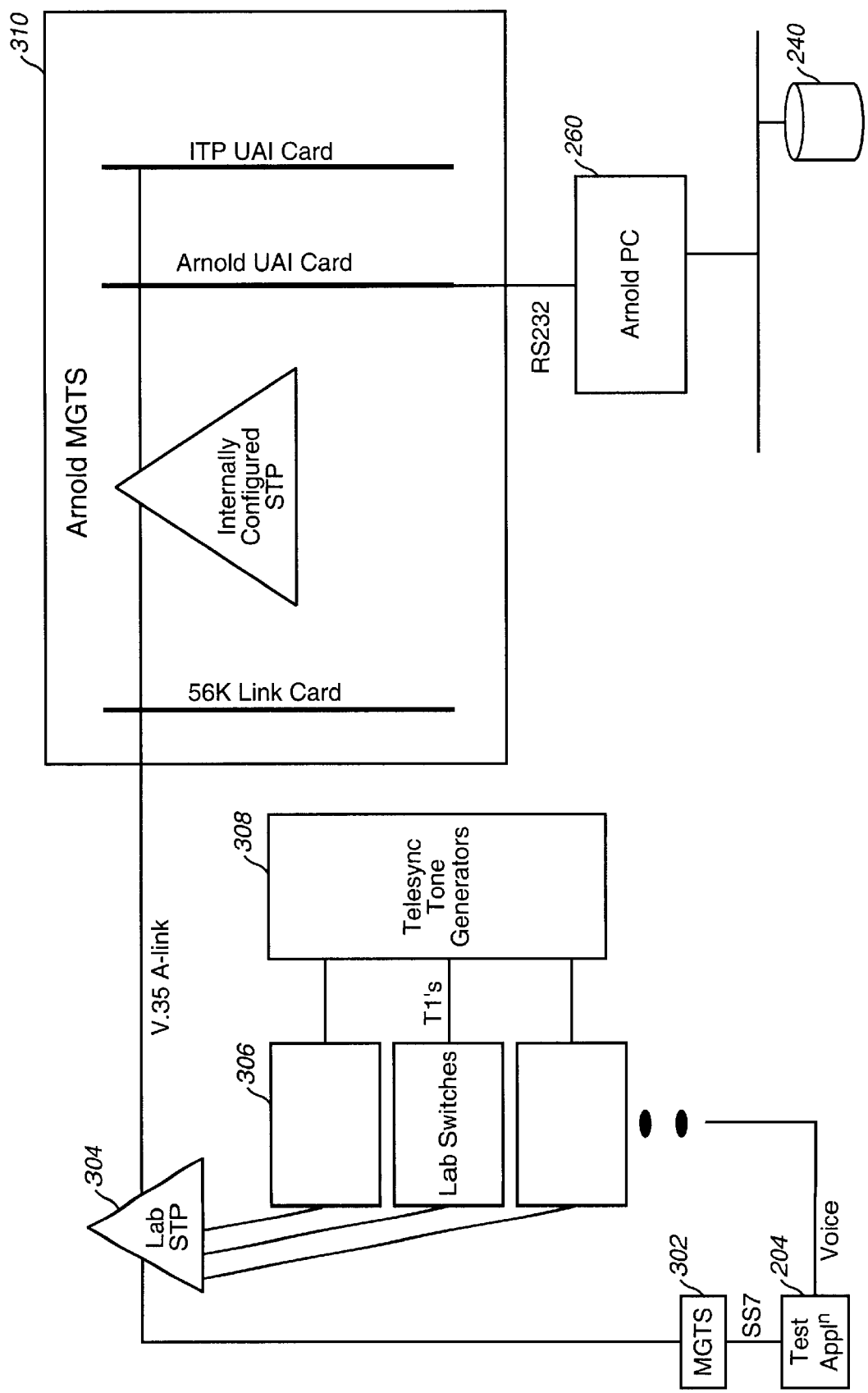
FIG. 4 is diagram of a network configuration in accordance with a preferred embodiment of the present invention.

FIG. 4 is a diagram illustrating an ARNOLD configuration in a network environment in accordance with a preferred embodiment of the present invention. Network 300 includes a test application 204, which drives a test case from the signaling as well as the voice aspect of a test case call. An MGTS (Message Generation Traffic Simulator, for example produced by Teckelec) 302 is a system developed to provide a serial interface to an STP 304. Test application 204 interfaces with commands over a serial connection to the MGTS 302 and the MGTS 302 in turn interfaces with an A-link to an SS7 STP 304.

A test application 204 interfaces to an STP 304 through an MGTS 302 to simulate appropriate SS7 messaging for the particular test case. A test application 204 also manages the voice connection for the test case call. ARNOLD 260 also interfaces to an STP 304 with an ARNOLD configured MGTS 310 in a similar manner, expect ARNOLD MGTS 310 is internally configured to represent and STP 304 and ARNOLD 260 is configured to represent the terminating SP 306. ARNOLD 260 is communicably coupled to database 240 containing configuration tables for the construction of responses to received messages. When ARNOLD 260 returns an acknowledgment of the received test message, test application 204 puts the voice session typically through to a telesync tone generator device 308 thereby simulating a call answered from the voice circuit perspective.

Figure 5:
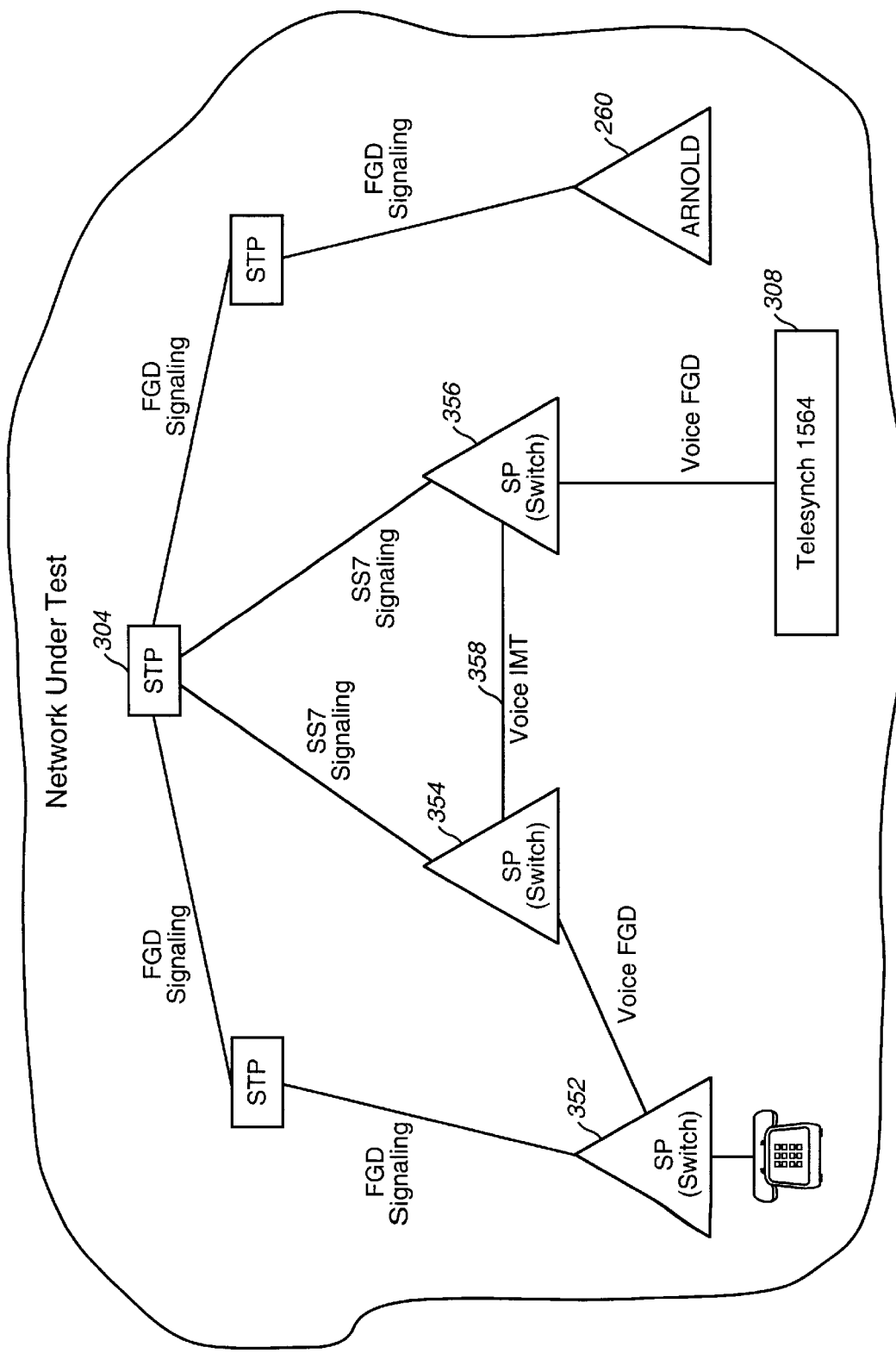
FIG. 5 is a high level depiction of a network configuration in accordance with a preferred embodiment of the present invention.

With reference next to FIG. 5, a diagram of a test environment is illustrated in accordance with a preferred embodiment of the present invention. Test environment 350 includes a number of test paths. Within test environment 350, ARNOLD 260 can certainly be any terminating SP within any particular test network. An originating SP 306, for example an Local Exchange Carrier ("LEC") switch 1 352 originates a call (e.g. actually from a test application) into the network which ultimately is routed through IXC switches 2 354 and 3 356, respectively, that are connected with an IMT 358. Switch 3 356 is set up to deliver the voice portion of the call appropriately per the test configuration. Signaling took place between all SPs 352, 354 and 356 to accomplish voice circuit set up, establishment, and release. The signaling is managed by SPs which are managed by STPs 304. SS7, STPs and SPs thereof, is all well known to those skilled in the art, but the aid of using these specific components and techniques in the discussion of the present invention does not limit the scope of the invention capabilities. ARNOLD 260 is a network switching element emulation, which receives messages from a connected STP 304 and sends messages back to the connected STP 304. ARNOLD 260 provides predictable SP 306 behavior according to data of SS7 messages, for example, the Initial Address Message (IAM), and TCAP messages. ARNOLD 260 allows determining if the other network elements under test are operating properly given the configured and predictable behavior ARNOLD 260 performs. The preferred embodiment of ARNOLD 260 is implemented on a PC.

In one embodiment, ARNOLD 260 responds to IAM and TCAP messages. With reference to FIG. 6, an actual LAM dump 400 is illustrated in accordance with a preferred embodiment of the present invention. Field 401 identifies the type of SS7 message with a value of 0.01 indicating an IAM. The IAM contains a mandatory set of fields in section 402 and a large number of optionally specified fields in section 404 of IAM dump 400. ARNOLD is easily extended for any type of signaling, any type of configured behavior, any type of supported messages, any type of data for detection in fields of messages. ARNOLD configures predictable response messages given contents of the IAM, or given particular TCAP (Transactional Capabilities Application Part) messages (e.g. for billing number queries, credit card queries).

The following outlines the functionality and configuration of the "Arnold" generic terminator. Arnold is a PC connected through an MGTS to the lab STP. Its primary function is to answer CCS7 phone calls. When an inbound IAM is received it responds with ACM and ANM. Based on a small configuration database other specific responses can be provided.

The following is an example of the ARNOLD.CFG file. This file is read on application start-up or anytime the ALT-C (configure) key is pressed. In this way, when Arnold is configured on a network, the application can be re-configured without being removed from service.

The ACM Message '$06 $04 $14 $01 $00' is defined to be returned when the Information Transfer Capability field of the User Service Information parameter is defined as a data call ($08 or $09). This ACM messages Backward Call Indicator specifies 'Subscriber Free', 'ISDN UP Used all the Way', and 'Terminating access ISDN'.

Release With Cause Processing

Based on configuration described below, responses other than the default ACM+ANM can be provided. Based on call Nature Of Address and called number, screening is performed to determine if a non-standard response should be provided.

Functionality is present to provide a BCSI parameter in the ACM message. The trigger to use this functionality is within Release With Cause (RWC) processing. Since generally the cause value to be returned is mapped from three digits of the called number the valid digit range is 000–999. FIG. 7 is a diagram of cause values and associated responses in accordance with a preferred embodiment of the present invention. The actual cause field within a release message is only 7 bits or 000–127. As a result, the range of 128–999 is available within database 240 to trigger additional functionality. It should be noted that these trigger cause values are only used to invoke functionality. It does not indicate that a release message will be sent.

Functionality was added to support the location identifier in the release message. This functionality is supported only for calls with a NOA of 3 and a length of ten digits.

The ARNOLD configuration file, ARNOLD.CFG, defines the test parameters to be performed by the present invention. For example, FIG. 8 is an illustration of commands that may be included in a configuration file in accordance with a preferred embodiment of the present invention. The MGTSCOM command configures the PC COM port for communications. In this example, the application is configured to use COM3 and IRQ5 at 9600 baud, no parity, 8 data bits, and one stop bit. The LOGFILE command configures the location to write log files when the ALT-L key is pressed. In this example, "H:\" is a network drive. The log file captures full hexidecimal data during processing. A separate decoder program (C7TU.EXE) can be used to view the log files. The RESPONSE command defines the location of the TCAP response table. This file is described in detail below. The BILLNUMS command defines the location of the billing number configuration file for TCAP queries. This file is described in detail below. The CARDNUMS command defines the location of the CARD number configuration file for TCAP queries. This file is described in detail below. The RWCNXX command defines specific NXX values for ten digit domestic calls with NOA=3 that should be Released with a Cause value rather than answered. There is a maximum of ten NXX entries allowed. This entry only effects NOA=3 calls with a length of ten digits. For calls with lengths other than ten digits see entries under NOA1 tables. The TPDNXX command defines specific NXX values for ten digit domestic calls with NOA=3 that should be disconnected by the termination party. There is a maximum of ten NXX entries allowed. For all calls with NOA=3, the fourth through sixth digits are captured and compared to the entries in this table. If a match is found, the call is answered, held up for fifteen seconds and released. The RNANXX command defines specific NXX values for ten digit domestic calls with NOA=3 that should be treated with Ring-No-Answer. There is a maximum of ten NXX entries allowed. For all calls with NOA=3, the fourth through sixth digits are captured and compared to the entries in this table. If a match is found, only ACM is provided. An ANM message is never sent. The ATBNXX command defines specific NXX values for ten digit domestic calls with NOA=3 that should be treated with an All-Trunks-Busy response. There is a maximum of ten NXX entries allowed. For all calls with NOA=3, the fourth through sixth digits are captured and compared to the entries in this table. If a match is found, the call is released with a cause value indicating user busy. The RWCNOA1 command is the release with cause configuration for cause with a nature of address (NOA) of 1. For calls with a NOA=1 a called number with a length greater than or equal to six digits, this table is searched and compared to the first three digits of the called number. This is also true for NOA 3 calls with the exception of calls with a length of ten digits. See RWCNXX above. If a match is found, the last three digits of the called number are returned as the cause value. The NOA1RWCTABLE and NOA1RWCTAB2 commands together define specific release with cause values to be returned on NOA=1 or NOA=3 calls with a called party number length less than six digits. The format of this table is [exact dialed digits]:[return cause value] with each group separated by a comma. The RWCNOA4 command is the release of cause configuration for calls with a NOA of 4. The NOA in this case indicates that the called number is an international number. For international calls with a NOA=4, the first three digits of the called number are compared to the entries in this table. If a match is found, the last three digits of the called number are returned as the cause value. There is a maximum of ten entries allowed in this table. The RWCLOC command is a release with cause and location code mapping request. The last three digits are the RWC and the fourth to the last digit flags the desired location.

The response configuration file, RESPONSE.CFG, provides responses to TCAP SCCP queries. For example, with reference now to FIGS. 9A–9C, an example of formats for a configuration file is depicted in accordance with a preferred embodiment of the present invention.

Although descriptive information, such as the response number, can follow the word "RESPONSE", this information is not used. All hexidecimal data following the word "RESPONSE" is used to form the TCAP response. Responses are counted by order of entry. In the depicted example, the first entry is RESPONSE #1, and the second entry is RESPONSE #2.

Responses start at the position of SCCP user data. The first four "* *" characters will be replaced with the inbound "originating ID," and the last "* *" characters will be replaced with the inbound "invoke ID." The first response in the table is the default for card calls and the second is the default for collect or third party calls.

The card configuration file, CARD.CFG, contains a table of card numbers and associated response numbers. For example, FIG. 10 is a configuration file formatted in accordance with a preferred embodiment of the present invention. The first number in FIG. 10, which consists of fourteen digits, is the card number and the second number is the response number. When a TCAP card number query is received, the present invention searches the table of card numbers stored in this file. If a match is found, the response number associated with the card number is returned. If a match is not found, a default response number, such as RESPONSE #1, is returned.

The billing configuration file, BILL.CFG, contains a table of billing numbers and associated response numbers. For example, FIG. 11 is an illustration of a billing configuration file formatted in accordance with a preferred embodiment of the present invention. The first number in FIG. 11, which consists of ten digits, is the billing number and the second number is the response number. When a TCAP billing number query is received, the present invention searches the table of billing numbers stored in this file. If a match is found, the response number associated with the billing number is returned. If a match is not found, a default response number, such as RESPONSE #2, is returned.

Figure 12:
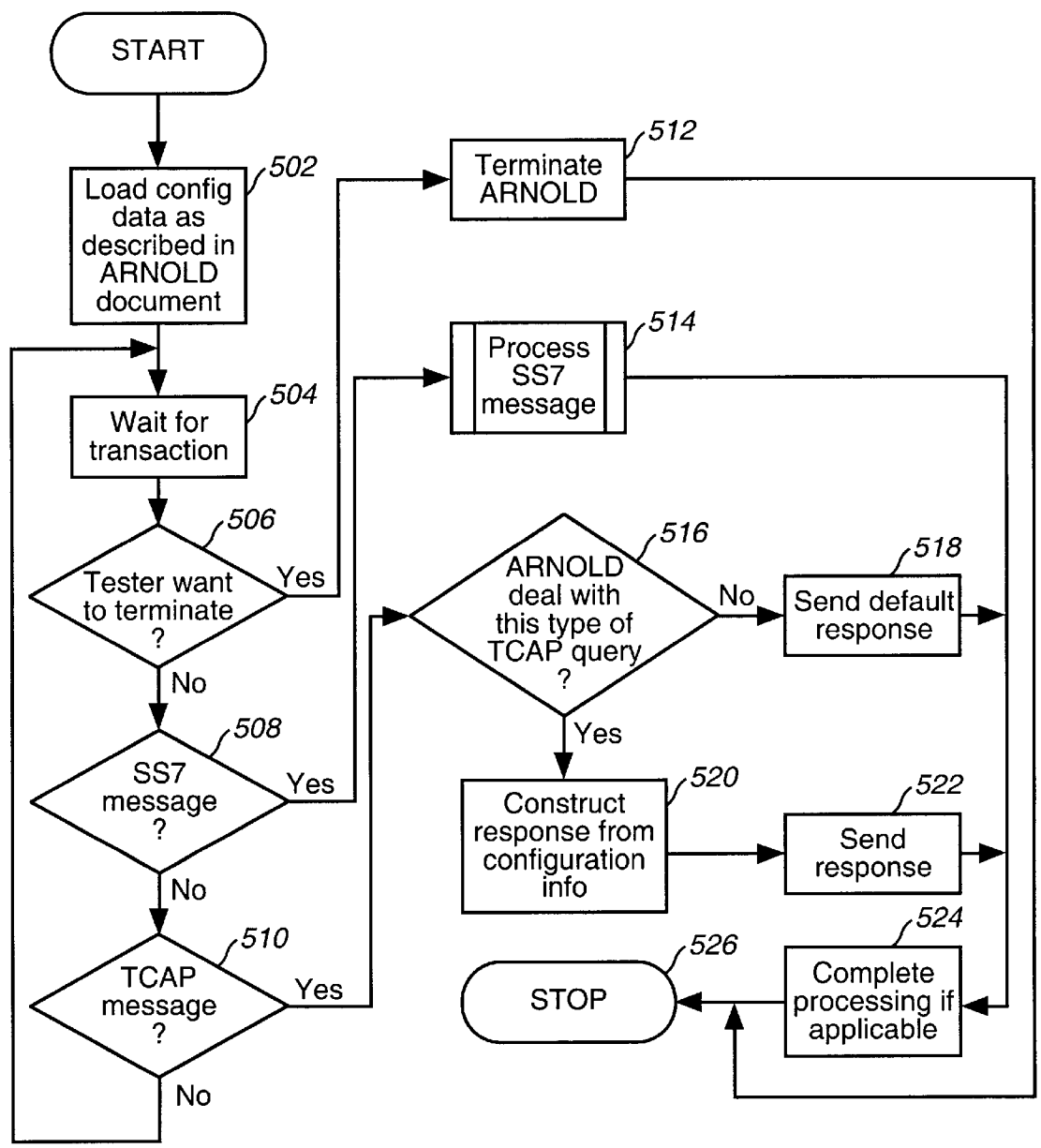
FIG. 12 is a flowchart of a process for representing the current invention's process structure.

Turning now to FIG. 12, a flowchart of a process structure in ARNOLD is depicted in accordance with a preferred embodiment of the present invention. Upon system power up or when instructed to perform configuration the process begins by loading configuration data (step 502). ARNOLD 260 then waits for any transactions in the configured network paths (step 504). ARNOLD then checks to see if the user has requested to terminate application (step 506). If the user wants to terminate ARNOLD 260 (step 512), a terminating procedure is called. ARNOLD 260 then checks for SS7 messaging and TCAP messaging (step 508 and 510) respectively.

If the received transaction is an SS7 message an SS7 process message routine is employed (step 514). If the received message is a TCAP message ARNOLD 260 looks in a configuration table to determine if a response is available for this query (step 516). If ARNOLD 260 is not able to configure a response to this type of query, a default response is sent (step 518). However, if ARNOLD 260 is capable of constructing a response the information is gathered from the configuration table (step 520), and a configured response is sent (step 522). ARNOLD 260 then completes processing if applicable (step 524) and the application then terminates (step 526).

Figure 13:
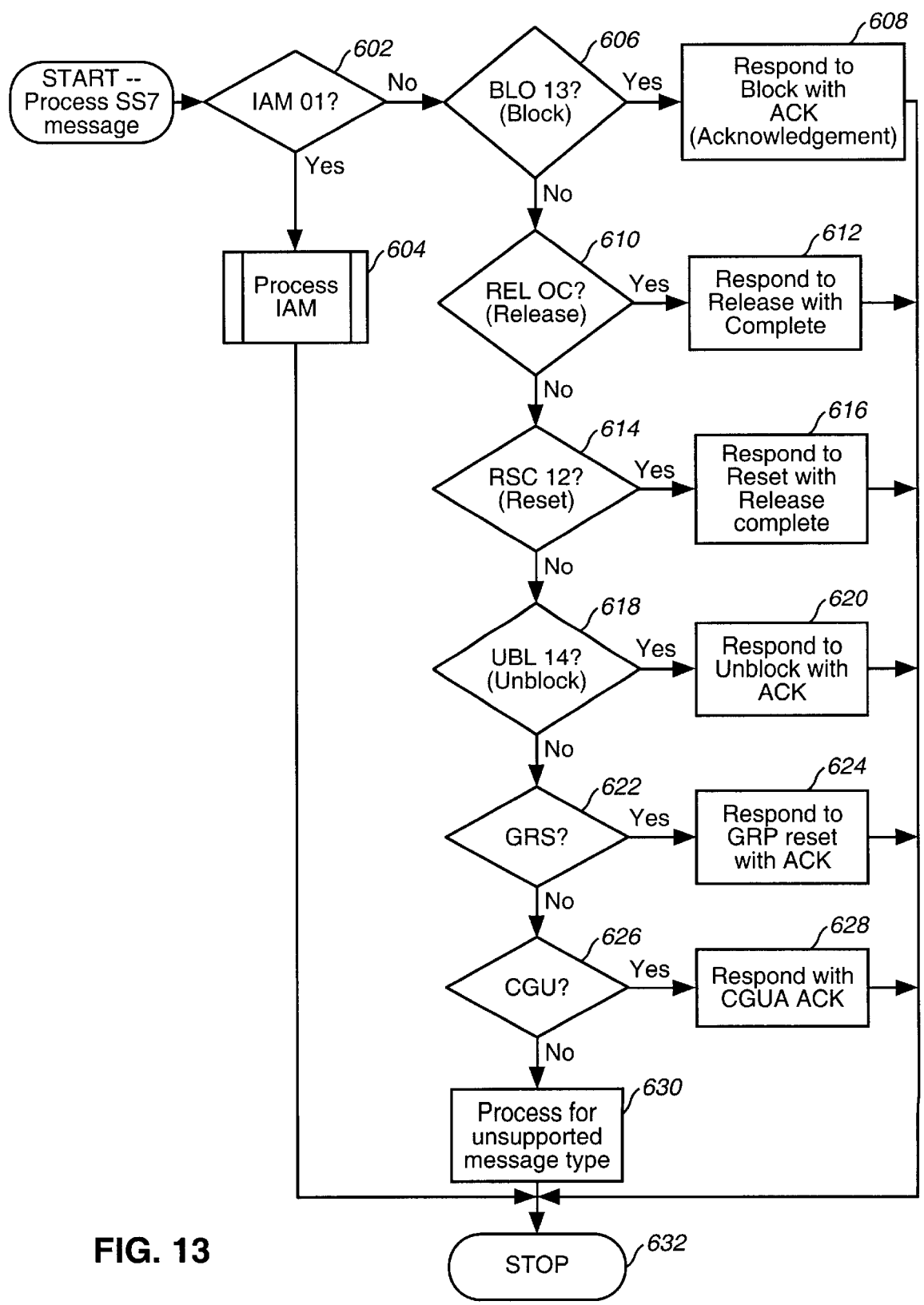
FIG. 13 is a flowchart of a process used to parse the received message.

Turning now to FIG. 13, a flowchart of a message process is illustrated in accordance with a preferred embodiment of the present invention. The process begins by determining if the received IAM configuration message is equal to a value of 01 (step 602). If the value is equal to 01, a routine is implemented to process IAM (step 604). If the message is not of IAM type a series of steps are followed determining the appropriate response to the message. If the message is a block (step 606), the message block is responded to using an ACK, step 608. If the message type is a Release with Complete (step 610), the appropriate response is sent (step 612). If the message type is a respond to reset with release complete (step 614), a respond to reset with release complete signal is sent (step 616). If the response to the received message type is unblock (step 618), then an ACK response to unblock is sent (step 620). If the response to the message type is a GRS (step 622), then the respond to GRP reset with ACK (step 624). If the message type is CGU (step 626), then the response to CGUA with ACK (step 628). If none of the above message types were received the process for unsupported message type is activated (step 630). The process then terminates (step 632).

Figure 14:
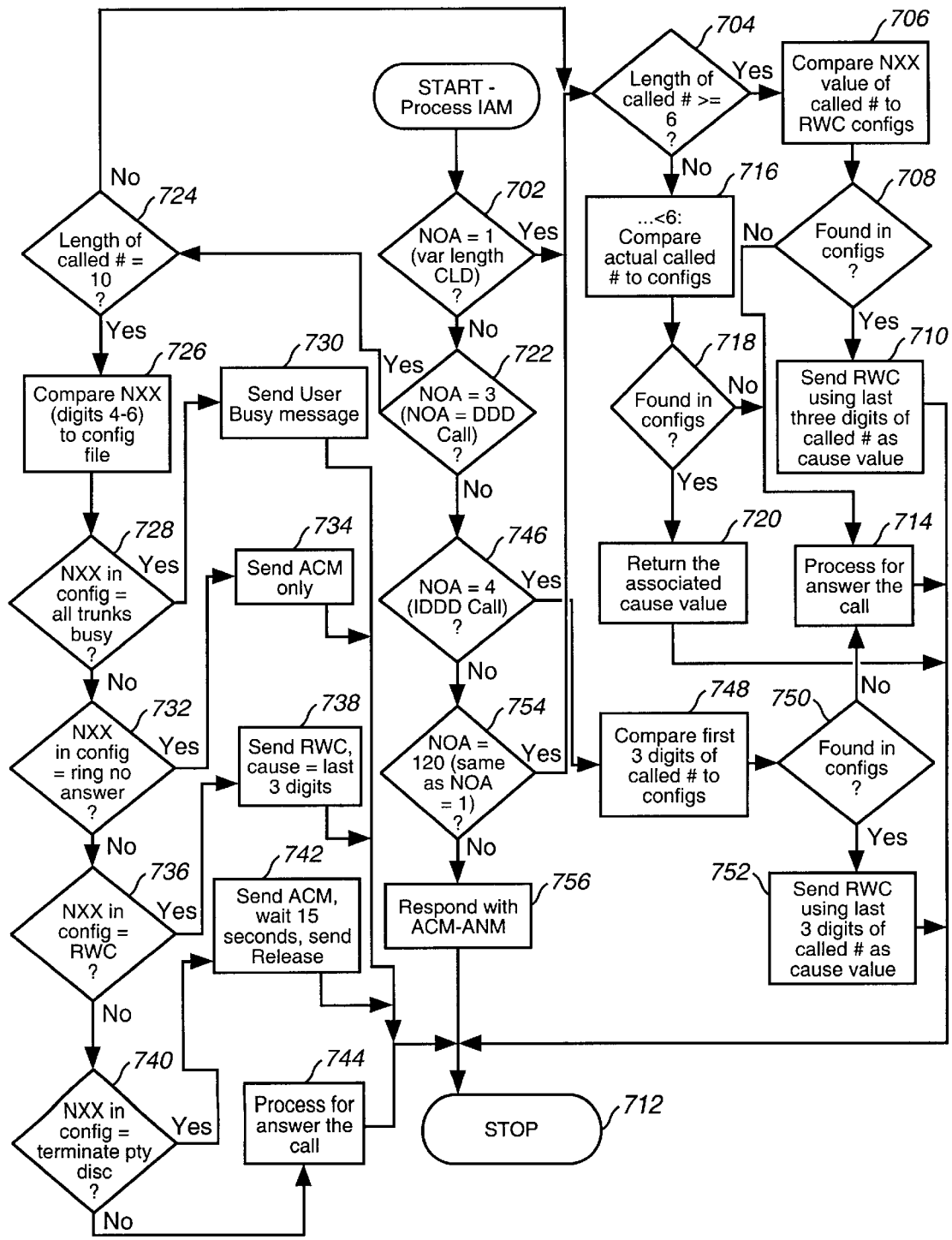
FIG. 14 is a flowchart of a process employed to process specific types of test messages.

Turning now to FIG. 14, a flowchart of an IAM process is illustrated in accordance with a preferred embodiment of the present invention. If the NOA field in the IAM message is a value of one (step 702) and the length of the called number is greater than or equal to six (step 704), the NXX number of the called number is compared to RWC configuration table (step 706). If the number is found in the configuration table (step 708), the RWC is sent using the last three digits of called number as cause value (step 710). The process then terminates (step 712). If the RWCs are not found in the configuration table (step 708), the process for answering the call is employed (step 714), and the process then terminates (step 712).

If the length of the called number is not greater than or equal to six (step 704), the actual call number is compared to a configuration table (step 716). If the number compared is not found in the configuration table (step 718), the process for answer call routine is implemented (step 714). If the called number is found in the configuration table the associated call value is returned (step 720). The application then terminates (step 712).

If the NOA field of the SS7 message is equal to three (step 722), the length of the called number is determined (step 724). If the called number is equal to ten the NXX is compared to a configuration table (step 726). If the NXX in the configuration table is equal to all trunks are busy (step 728), the user is informed (step 730), and the application is terminated (step 712). If all trunks are not indicated as busy (step 728) and the NXX field specifies a ring but no answer (step 732), the Address Complete Message (ACM) is sent (step 734). If the NXX field in the configuration table is set equal to RWC (step 736), an RWC response is sent (step 738). The application then terminates (step 712). If the NXX field value in configuration table is equal to terminate pty disc (step 740), an ACM response is sent (step 742). The process then terminates (step 712). If the terminate party disconnect in the NXX configuration field does not exist an answer process call is initiated (step 744).

If NOA is equal to four (step 746), the first three digits of the called number is compared to the configuration table (step 748). If the first three digits are found in the configuration table (step 750), an RWC is sent using the last three digits of called number as cause value (step 752).

If the NOA is equal to 120 (step 754), the same routine is implemented as if the NOA was equal to one, returning to step 704. If a NOA value does not exist or is not recognized an ACM-ANM response is sent (step 756).

It is important to note that while the present invention has been described in the context of a test network, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disk, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method for testing the integrity of at least one of a plurality of network elements within a network, wherein the network includes an emulator connected to and emulating at least one of said plurality of network elements, and a message configuration table coupled with a network, the method comprising the steps of:

- storing test information including critical event data of said network in a database;
- retrieving an entry from the emulator;
- parsing a signaling message from the emulator to identify a call record;
- extracting key fields from the signaling message;
- sending a default response if the received signaling message is unidentifiable in the message configuration table and discarding corresponding call records from the database;
- sending a message response with corresponding cause value indicating validity of received signaling message if the signaling message is identified in the message configuration table; and
- correlating data from said database to anticipated test case results.

2. The method of claim 1 further comprising distinguishing the type of received signaling message.

3. The method of claim 1 further comprising constructing a plurality of response messages from the message configuration table based on information obtained from individual fields in the signaling message and from the configuration table and received message type.

4. The method of claim 1 further comprising constructing a default message response for messages unsupported in configuration table.

5. The method of claim 1 further comprising sending all incoming messages to a database.

6. The method of claim 1 further comprising sending a response back to a network element.

7. A system for testing the integrity of at least one of a plurality of network elements in a telecommunications network, comprising:

- an emulator for emulating at least one of said plurality of network elements, said emulator connected to one of said plurality of network elements;
- a message configuration table coupled with said telecommunications network;
- a database that stores test information including critical event data of said telecommunications network;
- logic that retrieves an entry from said emulator and parses a signaling message to identify a call record;
- logic that extracts key fields from the signaling message;
- logic that sends a default response if the received signaling message is unidentifiable in the message configuration table and discards corresponding call records from the database;
- logic that sends a message response with corresponding response cause value indicating validity of a received signaling message if the signaling message is identified in the message configuration table; and
- means for correlating data from said database to anticipated test case results.

8. The system of claim 7 further comprising logic that distinguishes the type of received signaling message.

9. The system of claim of 7 further comprising logic that constructs a plurality of response messages from the configuration table based on information obtained from individual fields in the signaling message and from the configuration table and received message type.

10. The system of claim 7 comprising logic that constructs a default message response for messages unsupported in configuration table.

11. The system of claim 7 further comprising logic that sends all incoming messages to a database.

12. The system as recited in claim 7 further comprising logic that sends a response back to a network element.

13. The system of claim 7, wherein said emulator communicates directly with said database.

14. The system of claim 7, further comprising an interface for communicating critical event data into said database.

15. The system of claim 7, further comprising means for validation and synchronization of all said network elements for comprehensive testing.

16. A computer program product embodied on a computer readable medium for testing the integrity of a plurality of network elements, the computer program comprising:

- a computer readable medium;
- first instructions for retrieving an entry from an emulator, said emulator connected to emulating at least one of said plurality of network elements, and parsing signaling messages from said emulator to identify a call record;
- second instructions for extracting key fields from the signaling message;
- third instructions for sending a default response if the received signaling message is unidentifiable in the message configuration table and discarding corresponding call records from the database; and
- fourth instructions for sending a message response with corresponding response cause value indicating validity of received signaling message if the signaling message is identified in the configuration table,
- wherein the instructions are embodied on the computer readable medium.

17. A computer program product of 16 further comprising:

- fifth instructions for distinguishing a type of received signaling message.

18. The computer program product of claim 16 further comprising:

- fifth instructions for constructing a plurality of response messages from the configuration table based on information obtained from individual fields in the signaling message and from the configuration table and received message type.

19. The computer program product of claim 16 further comprising:

- fifth instructions for constructing a default message response for messages unsupported in configuration table.

20. The computer program product of claim 16 further comprising:

- fifth instructions for sending all incoming messages to a database.

21. The computer program products of claim 16 further comprising:

- fifth instructions for sending a response back to a network element.

22. A method for testing at least one of a plurality of network elements in a network, wherein the network includes an emulator connected to and emulating at least one of said plurality of network elements, and a message configuration table coupled with a network, the method comprising data processing implemented steps of:

receiving a message from one of said plurality of network elements in the network, wherein the message includes data;

automatically identifying data in the message;

automatically selecting a response from a plurality of responses using the data in the message; and automatically returning the response to the one of said plurality of network elements.

23. The method of claim 22, wherein the network includes a configuration file defining the plurality of responses for a plurality of messages in which the response is selected from the configuration file.

24. The method of claim 22, wherein the response is selected by corresponding the data to a response within the plurality of responses, wherein the plurality of responses includes a default response, and wherein the default response is selected when a correspondence of the data to a response within the plurality of responses is absent.

25. The method of claim 24, wherein the message is an initial address message.

* * * * *